US010696242B2

(12) United States Patent
Smith

(10) Patent No.: US 10,696,242 B2
(45) Date of Patent: Jun. 30, 2020

(54) VEHICLE INTERIOR PANEL INCLUDING A SNAP JOINT

(71) Applicant: Faurecia Interior Systems, Inc., Auburn Hills, MI (US)

(72) Inventor: Carl H. Smith, Fenton, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 78 days.

(21) Appl. No.: 16/008,479

(22) Filed: Jun. 14, 2018

(65) Prior Publication Data

US 2019/0381956 A1 Dec. 19, 2019

(51) Int. Cl.
*B60R 13/02* (2006.01)

(52) U.S. Cl.
CPC .................. *B60R 13/0206* (2013.01)

(58) Field of Classification Search
CPC .. B60R 13/0206; B60R 13/02; B60R 13/0237
USPC ........................................................ 296/1.08
See application file for complete search history.

(56) References Cited

U.S. PATENT DOCUMENTS

| 5,275,455 | A |   | 1/1994 | Harney et al. |
| 5,303,970 | A | * | 4/1994 | Young ...................... B60R 7/04 224/311 |
| 6,824,185 | B2 | * | 11/2004 | Tiesler ...................... B60R 7/04 296/214 |
| 7,264,295 | B2 |   | 9/2007 | Vander Sluis et al. |
| 7,404,996 | B2 |   | 7/2008 | Cowelchuk et al. |
| 8,182,217 | B2 |   | 5/2012 | Schaffer et al. |
| 8,919,846 | B2 |   | 12/2014 | Maass |
| 9,302,632 | B2 | * | 4/2016 | Yamamoto ............ B60R 13/025 |
| 2011/0142535 | A1 |   | 6/2011 | Molnar et al. |
| 2014/0346798 | A1 | * | 11/2014 | Chou .................. B60R 13/0206 296/1.08 |
| 2016/0176363 | A1 |   | 6/2016 | Bachelder et al. |

* cited by examiner

*Primary Examiner* — Pinel E Romain
(74) *Attorney, Agent, or Firm* — Reising Ethington P.C.

(57) ABSTRACT

A vehicle interior panel includes pieces held together by a snap joint formed when a protrusion of the outer piece is received by a receptacle of the inner piece. The receptacle is formed by a pair of walls extending from a back side of the inner piece, and the protrusion is received between the pair of walls. Oppositely facing bulges engage with oppositely facing grooves to form the joint. Sidewalls of the bulges also engage with angled sidewalls of the opposite piece to form a robust interlocking joint in which multiple pairs of opposing surfaces are engaged with each other to prevent relative movement of the inner and outer pieces in multiple directions. The features that form the snap joint can be molded as integral parts of the pieces being held together without the need for separate clips or fasteners.

15 Claims, 3 Drawing Sheets

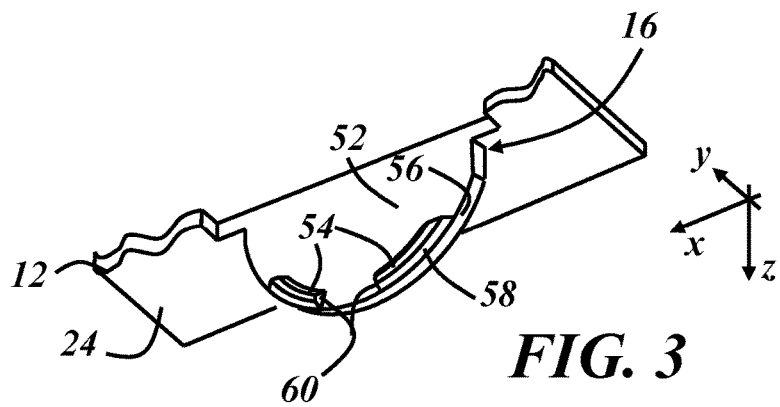
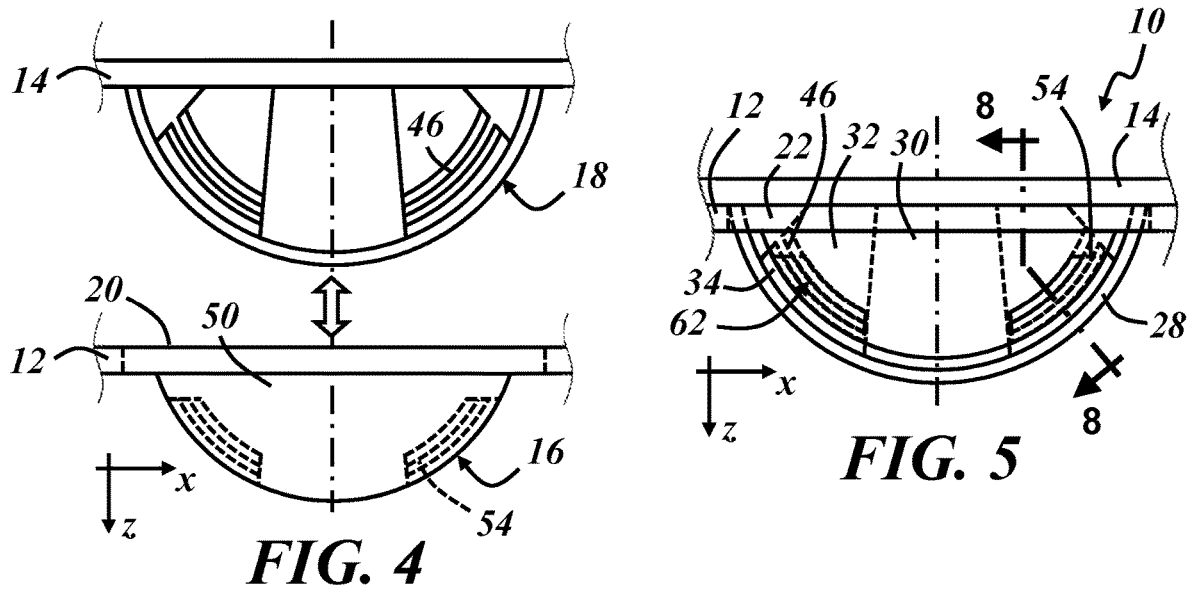
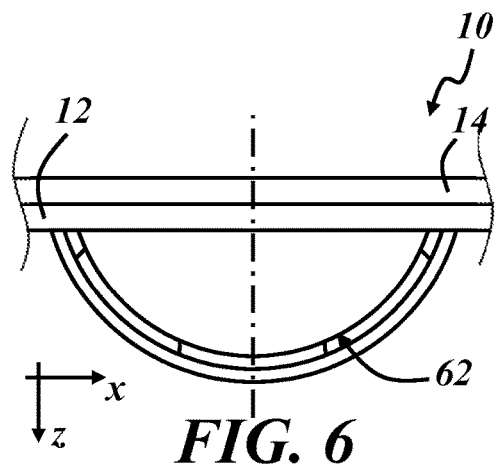

VEHICLE INTERIOR PANEL INCLUDING A SNAP JOINT

TECHNICAL FIELD

The present disclosure relates generally to vehicle interior panels and, in particular to attachment features for use with such panels.

BACKGROUND

Vehicle interiors are provided with desirable aesthetics by use of various panels and covers largely designed to conceal underlying structural and/or functional components. A vehicle instrument panel, for example, provides aesthetically pleasing contours, textures, and patterns while also concealing structural cross-members, weld joints, HVAC ductwork, etc. The visible surface facing the interior of a vehicle passenger cabin is usually formed by several individual pieces that are attached together and partly overlap each other. While plastic materials are used extensively in vehicle interior panels, metal clips and fasteners continue to be favored at joints where plastic panels are attached together. In some cases, plastic-based clips and fasteners have been used, but they are usually made from a different material and/or are formed separately from the panel.

An example of a multi-piece attachment feature for a vehicle interior panel is disclosed by Bachelder et al. in U.S. Patent Application Publication No. 2016/0176363. Bachelder teaches a system for attaching a trim panel to a B-pillar. The attachment feature includes a low-profile, sheet metal "doghouse" that is heat-staked to the back of the trim panel, along with a nylon clip inserted into the metal piece. The nylon clip protrudes away from the back of the panel to be inserted into an opening in the B-pillar with a washer between the nylon clip and the B-pillar. In some cases, the nylon clip and washer are omitted, and a threaded fastener is driven into a pilot hole in the metal doghouse to join the panel to the B-pillar.

SUMMARY

In accordance with various embodiments, a vehicle interior panel includes an inner piece and an outer piece. The inner piece has a front side, a back side, and a receptacle. The receptacle extends from the back side of the inner piece in a longitudinal direction as a molded-in portion of the inner piece. The outer piece is formed separately from the inner piece and has a back side and a protrusion. The protrusion extends from the back side of the outer piece in the longitudinal direction as a molded-in portion of the outer piece. A snap joint holding the inner and outer pieces together is formed when the protrusion is received from the front side of the inner piece between first and second walls of the receptacle with oppositely facing bulges extending transversely from one of the pieces engaged with oppositely facing grooves of the other of the pieces when the joint is formed.

In some embodiments, the receptacle includes the bulges and the protrusion includes the grooves. The bulges extend from the walls to face each other, and the grooves face away from each other.

In some embodiments, the receptacle includes two bulges spaced apart along the first wall and two bulges spaced apart along the second wall. Each one of the bulges along the first wall faces a corresponding one of the bulges along the second wall. Each of the bulges is engaged with one of the grooves when the joint is formed.

In some embodiments, the grooves are interconnected by an opening formed through the protrusion such that the bulges oppose each other through the opening.

In some embodiments, the protrusion includes a longitudinally extending central post, and tabs extends from sidewalls of the central post to form the grooves.

In some embodiments, the sidewalls of the central post form equal and opposite non-zero angles with the longitudinal direction such that a width of the central post increases with increasing distance from the back side of the outer piece.

In some embodiments, sidewalls of the bulges are engaged with the sidewalls of the central post when the joint is formed.

In some embodiments, a thickness of the tabs is less than a thickness of the protrusion.

In some embodiments, each bulge and each groove have an engagement surface that curves about a transverse axis.

In some embodiments, engagement surfaces of the bulges and grooves curve about the transverse axis in an arc shape.

In some embodiments, the protrusion includes a U-shaped frame and a central post. Opposite ends of the U-shape are at the back side of the outer piece, and the central post extends between the back side of the outer piece and an apex of the U-shape. The grooves are formed within the frame.

In some embodiments, the protrusion includes tabs extending from sidewalls of the central post to form the grooves.

In some embodiments, each groove is formed by a pair of tabs spaced apart along the same sidewall of the central post. One of the tabs of the pair interconnects the back side of the outer piece with the sidewall, and the other of the tabs of the pair interconnects the frame with the sidewall.

In some embodiments, the central post has a width at the back side of the outer piece that is smaller than a width at the apex of the U-shape to define angled sidewalls that engage with sidewalls of the bulges when the joint is formed.

In some embodiments, each wall of the receptacle includes a U-shaped edge, with opposite ends of the U-shape at the back side of the inner piece. The bulges of each wall are spaced apart along the U-shaped edge so that the central post fits between the bulges of each wall when the joint is formed.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

DESCRIPTION OF THE DRAWINGS

One or more embodiments will hereinafter be described in conjunction with the appended drawings, wherein like designations denote like elements, and wherein:

FIG. 3 is a cut-away view of the inner piece of FIG. 2;

FIG. 4 is a side view of the inner and outer pieces illustrated prior to assembly and snap joint formation;

FIG. 5 is a side view of the inner and outer pieces of FIG. 4 illustrated after assembly and snap joint formation;

FIG. 6 is the side view of FIG. 5 with hidden lines removed;

DETAILED DESCRIPTION OF EMBODIMENTS

Described below is a vehicle interior panel held together by a snap joint formed when a protrusion of one piece of the panel is received by a receptacle of another piece. Oppositely facing bulges engage with oppositely facing grooves to form the joint. Sidewalls of the bulges may also engage with angled sidewalls of a central post to form a robust interlocking joint in which multiple pairs of opposing surfaces are engaged with each other to prevent relative movement of the joined pieces in multiple directions. The features that form the snap joint can be molded as integral parts of the pieces being held together without the need for separate clips or fasteners, thereby reducing costs, secondary operations, and manufacturing defects.

Figure 1:
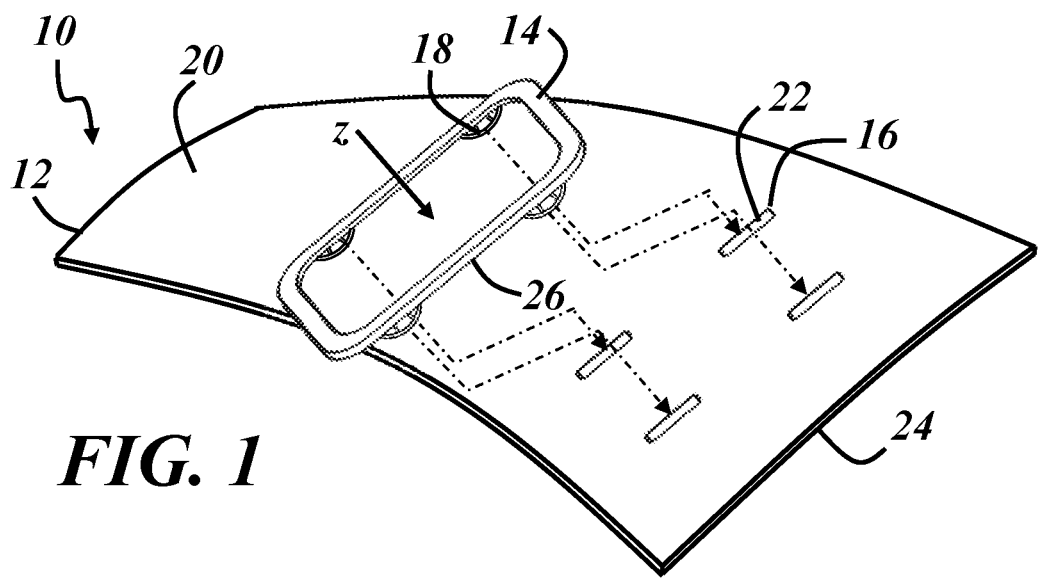
FIG. 1 is an exploded view of a portion of a vehicle interior panel assembled using snap joints.

FIG. 1 is an exploded view of a portion of a vehicle interior panel 10 assembled using one or more snap joints. The panel 10 includes an inner piece 12 and a separately formed outer piece 14 that at least partially covers the inner piece when assembled. The panel 10 can be any vehicle interior panel that presents a visible surface to the interior of a vehicle passenger cabin, such as an instrument panel, door panel, console panel, glove box door, pillar cover, steering wheel panel, or seat panel, to name a few examples. In this example, the outer piece 14 is a decorative trim bezel intended to cover unfinished edges of an underlying feature (not shown), such as an HVAC vent opening, a GPS screen, or a shifter assembly. The inner piece 12 is configured for attachment with another underlying panel or vehicle structure by any suitable means.

The inner piece 12 includes one or more receptacles 16 configured to receive a corresponding number of protrusions 18 extending from the outer piece 14. The receptacles 16 open along a front side 20 of the inner piece 12 at slotted openings 22 that extend through to a back side 24 of the inner piece. The protrusions 18 extend from a back side 26 of the outer piece 14 in a longitudinal (Z) direction. As used herein, the longitudinal direction is defined with respect to the receptacles 16 and protrusions 18 independently from directions with respect to the vehicle and is the direction of assembly in the illustrated examples.

Figure 2:
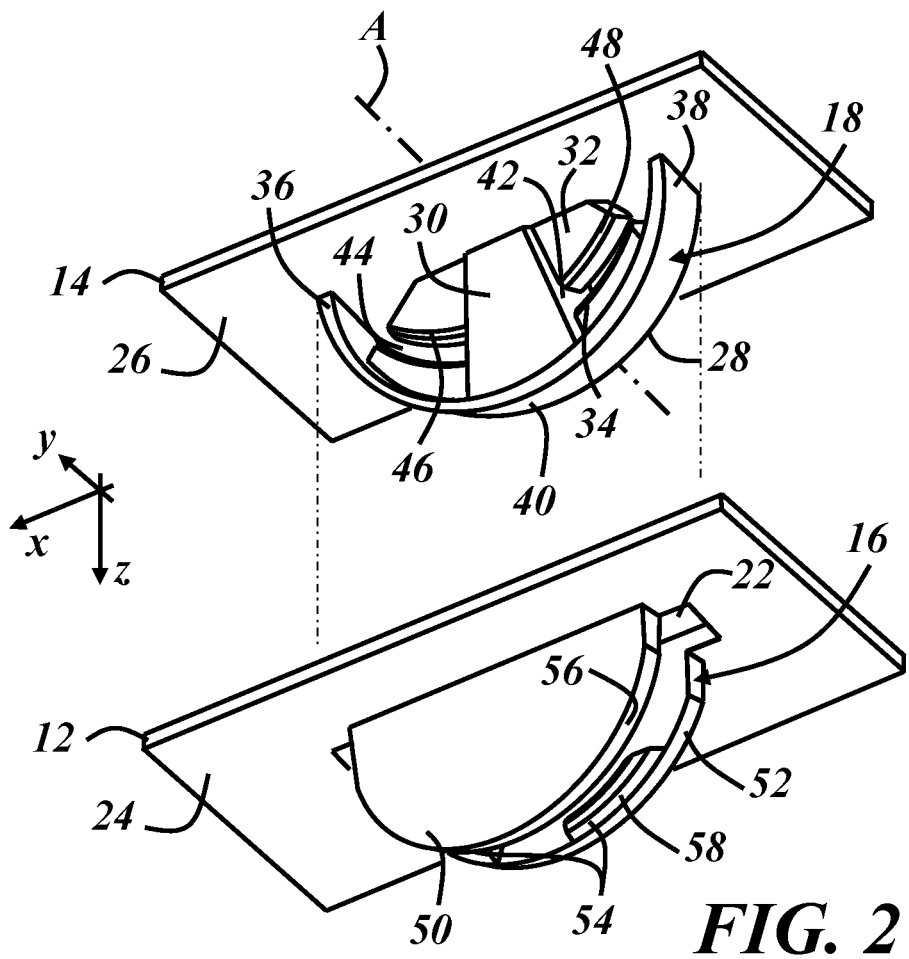
FIG. 2 is an exploded view of portions of a back side of inner and outer pieces of a vehicle interior panel configured to form a snap joint.

FIG. 2 is an enlarged view of an exemplary receptacle 16 and protrusion 18 from the respective back sides 24, 26 of portions of the inner and outer pieces 12, 14. This view illustrates the receptacles 16 extending from the back side 24 of the inner piece 12, as well as the protrusions 18 extending from the back side 26 of the outer piece 14. Each receptacle 16 and protrusion 18 may be a molded-in feature of their respective pieces 12, 14. For example, each piece 12, 14 may be formed in a plastics molding process (e.g., thermoplastic injection molding) from a single shot of molten plastic such that the receptacles 16 and protrusions 18 are integral and inseparable portions of their respective pieces 12, 14—i.e., neither the receptacles nor the protrusions are formed in separate manufacturing operations and later attached to the inner and outer pieces.

The illustrated protrusion 18 includes a U-shaped frame 28, a central post 30, and tabs 32, 34. The frame 28 has opposite ends 36, 38 at the back side 26 of the outer piece 14 with an apex 40 of the U-shape between the two ends and spaced away from the back side 26 of the piece 14. The U-shape of the frame 28 lies in a plane parallel with the longitudinal (Z) direction—the x-z plane in the illustrated example. The U-shape of the frame 28 lends structural rigidity to the protrusion 18, eliminates sharp corners at the back of the outer piece, and functions as an alignment and guidance feature during assembly when received in the corresponding receptacle 16.

The central post 30 extends between the back side 26 of the outer piece 14 and the apex 40, and each of the tabs 32, 34 extends from a sidewall 42 of the post 30. Proximal tabs 32 interconnect the back side 26 of the outer piece 14 with the sidewalls 42 of the post 30, and distal tabs 34 interconnect the frame 28 with the sidewalls of the post. Each proximal tab 32 and distal tab 34 are spaced apart from each other along the sidewall 42 from which they extend, opposing each other across a gap 44 and defining a pair of oppositely facing grooves 46. The grooves 46 face in opposite directions that are transverse to the longitudinal direction—i.e., in positive and negative y-directions in the illustrated embodiment. Each groove 46 is defined along chamfer surfaces 48 of the opposing tabs 32, 34, extending in a circumferential direction about a transverse axis A lying along the y-direction so that the grooves 46 are arcuate in shape. Other configurations are possible. For example, grooves 46 of the protrusion 18 may be formed to face in opposite transverse directions with or without the frame 28, central post 30, or tabs 32, 34, and each of these elements may be in a different form or shape where included. The illustrated curvature of the individual elements of the protrusion 18 may also be non-arcuate, such as elliptical or parabolic about a similar transverse axis A.

The illustrated receptacle 16 includes first and second walls 50, 52 extending from the back side 24 of the inner piece 12 with bulges 54 formed along each wall. Each wall 50, 52 is located along one of the long sides of the slotted opening 22 and has a U-shaped edge 56. The length of the edge 56 along the U-shape is smaller than that of the frame 28 of the protrusion 18 such that each wall 50, 52 fits within the frame when assembled. The width of the slot 22 and, thereby, the distance between the walls 50, 52 is slightly larger than the width of the frame 28 of the protrusion 18—i.e., sufficiently large to allow the protrusion to slide between the walls without measurable resistance.

Each of the bulges 54 is configured to fit into and engage a corresponding groove 46 of the protrusion 18. In this example, each bulge 54 curves about the same transverse axis A as the corresponding groove 46 when assembled and includes chamfer surfaces 58 complimentary to the chamfer surfaces 48 of the corresponding groove. Each bulge 54 also extends away from the wall in a direction (i.e., the y-direction) transverse to the longitudinal (Z) direction.

As illustrated in the cutaway view of FIG. 3, in which the first wall 50 is omitted, the receptacle 16 may include a pair of bulges 54 spaced apart along the edge 56 of each wall 50, 52. The distance between the pair of bulges 54 on each wall corresponds to the width of the central post 30 at the frame 28 of the protrusion 18 (FIG. 2) such that sidewalls 60 of the bulges engage the sidewalls 42 of the post 30 when assembled. The first and second walls 50, 52 are substantially identical to each other with pairs of bulges 54 extending away from each wall toward to the other wall and opposing each other.

FIG. 4 is a side view of respective portions of the inner and outer pieces 12, 14 of the vehicle interior panel with the receptacle 16 and the protrusion 18 aligned for assembly. The protrusion 18 is received by the receptacle 16 from the front side 20 of the inner piece 12 and between the first and second walls 50, 52 of the receptacle (only the first wall 50 is visible in FIG. 4). When the bulges 54 are engaged with the grooves 46 a snap joint is formed that holds the inner and outer pieces 12, 14 together without the need for additional clips, fasteners, adhesive, or other attachment means. Various views of the formed snap joint 62 are illustrated in FIGS. 5-8.

FIG. 5 is a side view of a portion of the assembled panel 10, including the snap joint 62. In this view, as in FIG. 4, broken lines are used to illustrated hidden features of the assembly, including the slotted opening 22, the proximal tabs 32, the grooves 46, and the bulges 54, along with portions of the frame 28, the central post 30, and the distal tabs 34. FIG. 6 is the same side view as FIG. 5 with the hidden lines removed to illustrate the external appearance of the snap joint 62.

Figure 7:
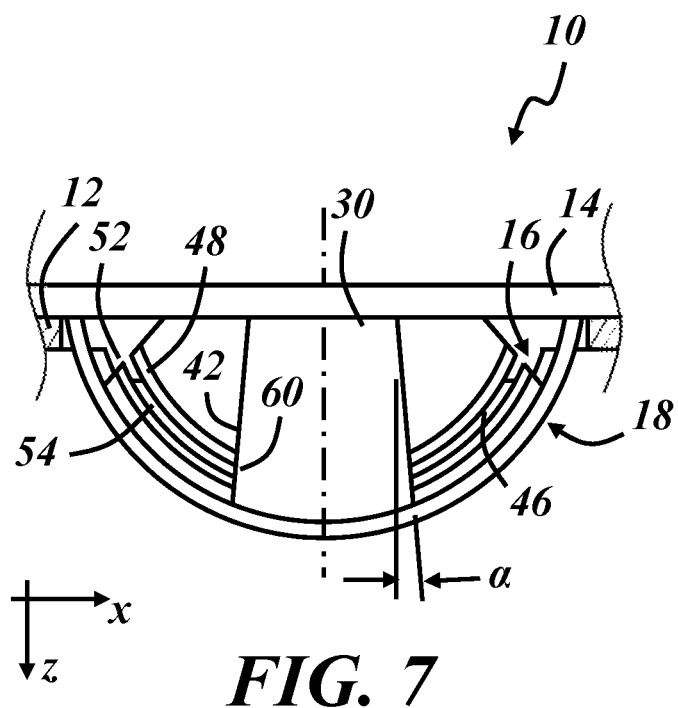
FIG. 7 is the side view of FIGS. 5 and 6 with a wall of the receptacle omitted to show the protrusion engaged in the receptacle.

FIG. 7 is the same side view as FIGS. 5 and 6 with the first wall 50 omitted to show the protrusion 18 engaged with the bulges 54 along the second wall 52 of the receptacle 16. FIG. 7 also illustrates that, in addition to the grooves 46 and bulges 54 being engaged, the sidewalls 42 of the central post 30 of the protrusion 18 are engaged with the sidewalls 60 of the bulges 54. As such, the illustrated snap joint 62 includes a relatively large number of opposing engagement surfaces. Each chamfer 48, 58 of each groove 46 and bulge 54, along with each post sidewall 42 and opposing bulge sidewall 60, may be considered an engagement surface. The illustrated protrusion 18 includes eight chamfer surfaces 48 and two post sidewalls 42, and the illustrated receptacle 16 includes eight chamfer surfaces 58 and four bulge sidewalls 60. These multitudes of engagement surfaces define twelve engagement interfaces along which engagement surfaces of each of the attached pieces 12, 14 oppose and contact each other.

These engagement interfaces are positioned in multiple different orientations, thereby preventing relative movement of the inner and outer pieces 12, 14 in multiple different directions. Moreover, some of the engagement surfaces are shaped and oriented to effectively prevent disassembly from the front side of the panel 10.

For example, each post sidewall 42 may be angled with respect to the longitudinal (Z) direction. In the illustrated example, the two sidewalls 42 form equal and opposite non-zero angles α with respect to the z-direction. In the example of FIG. 7, the angle α is about 5 degrees such that the angle between the oppositely facing sidewalls 42 is about 10 degrees. The angle α may be in a range from 1 degree to about 45 degrees, and more preferably between about 3 degrees and 10 degrees. Each bulge sidewall 60 may be formed at the same angle α. When oriented as shown, such that the width of the central post 30 (in the x-direction) increases with increasing distance from the back side 26 of the outer piece 14, an undercut condition is created by virtue of the wedge shape, permanently locking the two pieces 12, 14 together in the z-direction. If a force is applied in the z-direction to attempt to separate the pieces 12, 14, any relative movement in the z-direction only increases the amount of interference in the x-direction between the pieces due to the wedge shape of the post 30. An increasing angle α results in an increased resistance to separation.

Figure 8:
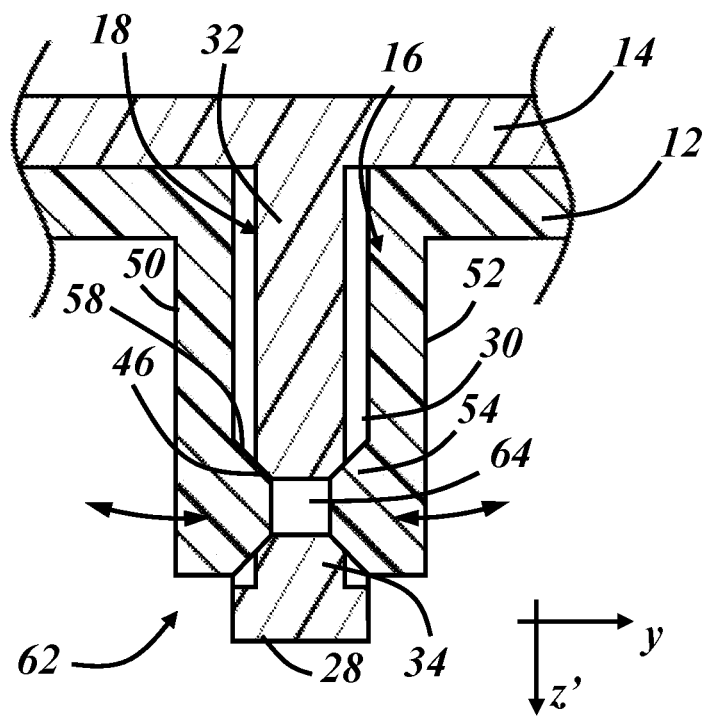
FIG. 8 is a cross-sectional view of the snap joint of FIGS. 5-7.

FIG. 8 is a cross-sectional view of the snap joint 62 taken through the engaged grooves 46 and bulges 54. The double-headed arrows in FIG. 8 indicate the directions of movement of the walls 50, 52 during panel assembly. Each wall 50, 52 is deflected from its relaxed state and away from the other wall when the protrusion 18 is received in the receptacle 16, particularly when the frame 28 is in contact and moving along the bulge chamfers 58. The walls 50, 52 return to their original position once the bulges 54 are engaged with their respective grooves 46. A small amount of residual load may be designed into the walls 50, 52 such that they do not fully return to their relaxed state.

The bulges 54 on opposite sides of the protrusion 18 extend from the walls 50, 52 in opposite directions to face each other, while the grooves 46 on opposite sides of the protrusion face in opposite directions away from each other. In this example, the oppositely facing grooves 46 are interconnected by an opening 64 formed through the protrusion 18 such that the bulges 54 oppose each other through the opening. It is contemplated that the grooves 46 may be formed only partly through the thickness of the protrusion 18 (i.e., the opening 64 is omitted), or that the opposing bulges 54 may touch each other through the opening when the joint 62 is formed. It is also possible to form a similar snap joint 62 in which the bulges 54 extend away from a wall of the protrusion 18 and the grooves 46 are formed in walls or by tabs of the receptacle 16.

FIG. 8 also illustrates varying thicknesses among the different features of the snap joint 62. In particular, the tabs 32, 34 have a thickness that is less than a total thickness of the protrusion 18 (in the y-direction), which in this case is defined by the thickness of the frame 28 and central post 30. The difference in thickness between the tabs 32, 34 and the central post 30 provides the sidewalls 42 of the post (see FIG. 2) and the associated wedged undercut condition described above. Without the sidewalls 42, particularly angled sidewalls, disassembly of the two pieces 12, 14 requires less effort, as the chamfers of the joint may serve to deflect the walls 50, 52 of the receptacle apart when a separation force is applied.

While the walls 50, 52 and associated bulges 54 may have the appearance of simple cantilever snap tabs in FIG. 8, it is noted that FIG. 8 is a cross-section taken perpendicular to the grooves 46 and bulges 54 along a single plane lying in a radial direction (z'). The engaged features of the snap joint 62 are curved features and therefore behave quite differently from simple cantilever snap tabs. For instance, if the cross-section of FIG. 8 represented a cross-section through a groove and bulge extending in a single cartesian direction (e.g., the y-direction), resistance to relative movement between the pieces 12, 14 would be provided only in the z-direction—i.e., some amount of force would be required in the z-direction to spread the walls 50, 52 apart, while freedom of movement would be present in the y-direction. But because the grooves 46 and bulges 54 are curved, with the radial direction (z') continually changing therealong, resistance to relative movement between the pieces 12, 14 is be provided in both the z-direction and the y-direction at all points along the curved surfaces. In other words, the curvature further restrains the relative movement and reduces the number of degrees of freedom of movement when compared to a single cantilever snap tab.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel comprising:
an inner piece having a front side, a back side, and a receptacle extending from the back side of the inner piece in a longitudinal direction as a molded-in portion of the inner piece; and
an outer piece formed separately from the inner piece, the outer piece having a back side and a protrusion extending from the back side of the outer piece in the longitudinal direction as a molded-in portion of the outer piece,
wherein a snap joint holding the inner and outer pieces together is formed when the protrusion is received from the front side of the inner piece between first and second walls of the receptacle with oppositely facing bulges extending transversely from a first one of the pieces engaged with oppositely facing grooves of a second one of the pieces when the joint is formed.

2. The vehicle interior panel as defined in claim 1, wherein the receptacle includes the bulges and the protrusion includes the grooves, the bulges extending from the walls to face each other and the grooves facing away from each other.

3. The vehicle interior panel as defined in claim 2, wherein the receptacle includes two bulges spaced apart along the first wall and two bulges spaced apart along the second wall, each one of the bulges along the first wall facing a corresponding one of the bulges along the second wall, and each of the bulges being engaged with one of the grooves when the joint is formed.

4. The vehicle interior panel as defined in claim 2, wherein the grooves are interconnected by an opening formed through the protrusion such that the bulges oppose each other through the opening.

5. The vehicle interior panel as defined in claim 1, wherein the protrusion includes a longitudinally extending central post and tabs extending from sidewalls of the central post to form the grooves.

6. The vehicle interior panel as defined in claim 5, wherein the sidewalls form equal and opposite non-zero angles with the longitudinal direction such that a width of the central post increases with increasing distance from the back side of the outer piece.

7. The vehicle interior panel as defined in claim 5, wherein sidewalls of the bulges are engaged with the sidewalls of the central post when the joint is formed.

8. The vehicle interior panel as defined in claim 5, wherein a thickness of the tabs is less than a thickness of the protrusion.

9. The vehicle interior panel as defined in claim 1, wherein each bulge and each groove have an engagement surface that curves about a transverse axis.

10. The vehicle interior panel as defined in claim 9, wherein the engagement surfaces curve about the transverse axis in an arc shape.

11. The vehicle interior panel as defined in claim 1, wherein the protrusion includes a U-shaped frame and a central post, with opposite ends of the U-shape at the back side of the outer piece and the central post extending between the back side of the outer piece and an apex of the U-shape, the grooves being formed within the frame.

12. The vehicle interior panel as defined in claim 11, wherein the protrusion further comprises tabs extending from sidewalls of the central post to form the grooves.

13. The vehicle interior panel as defined in claim 12, wherein each groove is formed by a pair of tabs spaced apart along the same sidewall, one of the tabs of the pair interconnecting the back side of the outer piece with the sidewall, and the other of the tabs of the pair interconnecting the frame with the sidewall.

14. The vehicle interior panel as defined in claim 12, wherein the central post has a width at the back side of the outer piece that is smaller than a width at the apex of the U-shape to define angled sidewalls that engage with sidewalls of the bulges when the joint is formed.

15. The vehicle interior panel as defined in claim 11, wherein each wall of the receptacle includes a U-shaped edge, with opposite ends of the U-shape at the back side of the inner piece, the bulges of each wall being spaced apart along the U-shaped edge so that the central post fits between the bulges of each wall when the joint is formed.

\* \* \* \* \*